Patented Feb. 16, 1943

2,311,488

UNITED STATES PATENT OFFICE 2,311,488

METHOD OF DEPOSITING RUBBER AND COMPOSITION EMPLOYED THEREIN

Robert E. Thomas, Stow, Ohio, assignor to American Anode Inc., Akron, Ohio, a corporation of Delaware No Drawing. Application April 2, 1940,
Serial No. 327,455

12 Claims. (Cl. 117—47)

This invention relates to the production of rubber articles and rubber coatings directly from aqueous dispersions of rubber and particularly to a method of depositing rubber from aqueous dispersions and to a composition employed therein.

There is in widespread commercial use a process of depositing rubber from aqueous rubber dispersions in which a deposition form or base is coated with a fluid composition containing a coagulant for aqueous dispersions dissolved in a volatile liquid vehicle, after which at least a part of the volatile vehicle is evaporated to form a non-flowing coating on the form, and the coated form is immersed in an aqueous dispersion of rubber to receive a coating of coagulated rubber. Volatile organic solvents such as alcohol and acetone ordinarily have been used as the liquid vehicle for the coagulant composition, and the loss of such relatively expensive solvents has materially increased the cost of such commercial operations. Additionally, many of the volatile organic solvents are toxic and/or explosive in vaporous form. While it has been proposed heretofore to use water as the volatile vehicle for the coagulant composition, this expedient has not been adopted for commercial use because of difficulties encountered in securing uniform interfacial contact between the water solution of coagulant and the deposition base and also between the coagulant coating and the aqueous dispersion of rubber when the coated form was immersed in the dispersion. Such non-uniform wetting results in the production of a non-uniform coagulant coating on the form and the consequent production of a non-uniform and uneven rubber deposit. Also, pits, blisters, and other similar defects frequently have been produced for the same reasons.

I have discovered a method permitting the use of aqueous coagulant solutions in the process described without the attendant disadvantages heretofore encountered. According to the present invention, an aqueous solution of coagulant is employed and there is added to the coagulant solution a sufficient quantity of a wetting agent to saturate the solution and to provide a supernatant layer of wetting agent on the surface of the coagulant composition. In order to avoid unnecessary and undesirable dilution of the coagulant solution, wetting agents not more than slightly soluble in water, should be employed. As a practical matter wetting agents soluble up to the extent of about 10% by weight may be employed.

When a deposition base is immersed in such an aqueous coagulant composition having a supernatant layer of wetting agent thereon, the base first receives a thin coating of the substantially pure wetting agent followed by a coating of the aqueous coagulant solution. When the base is withdrawn from the composition a further thin layer of the wetting agent is applied over the coating of coagulant composition. Upon immersing the coated base in an aqueous dispersion of rubber and drying and vulcanizing the resulting rubber deposit, a rubber article or coating of highly uniform and entirely satisfactory characteristics is produced.

Similar results may be obtained by successively immersing a deposition base in separate fluid compositions containing, respectively, the relatively insoluble wetting agent and the aqueous coagulant solution, to apply successive coatings in substantially the manner previously described. In some instances, it is possible to omit one of the two coatings with wetting agent. Such procedures generally are less desirable, however, because of the added manipulation and equipment required.

In a specific example illustrative of a preferred embodiment of my invention, an aqueous coagulant composition is prepared by dissolving 300 g. of calcium chloride and 100 g. of zinc chloride in one liter of water and acidifying the solution by adding 100 g. of glacial acetic acid. To the prepared solution is then added a sufficient quantity of a relatively insoluble wetting agent, such as butyl lactate, to saturate the solution and, in addition, to provide a supernatant layer of the wetting agent of about one-half inch in thickness on the surface of the solution. When utilizing an ordinary beaker-like vessel as the container, 100 g. of butyl lactate will usually suffice in the above composition.

A conventional deposition base is then immersed momentarily in the prepared composition, the base is withdrawn from the composition, and is manipulated in the air in the customary manner to effect uniform distribution of the coagulant composition over the surface of the base and to expedite evaporation of the water from the coating. When the coating has reached a non-flowing consistency, the coated form is immersed in, or otherwise associated with, an aqueous dispersion of rubber for a time sufficient to effect coagulation and deposition of a required thickness of rubber. Thereafter the deposited rubber is washed, dried, and vulcanized, all according to conventional practice.

Instead of adding the butyl lactate wetting agent to the aqueous coagulant composition, the deposition base may be immersed in butyl lactate, diluted somewhat if desired with a diluent such as alcohol or acetone, then immersed in the aqueous coagulant solution without the wetting agent and finally again immersed in the butyl lactate, followed by the association with the aqueous dispersion of rubber as hereinabove described.

Coagulant compositions containing three essential constituents of the same general character as those employed in the present invention are described in the Willson U. S. Patent No. 1,996,090, but Willson preferably used volatile organic solvents and wetting agents relatively more soluble in water than are the wetting agents here employed. As has been indicated, I prefer to use wetting agents which are not more than slightly soluble in water, which for practical purposes may be taken to include only wetting agents soluble to a lesser extent than 10% by weight. In addition to the butyl lactate hereinabove specifically mentioned, it is possible to use other relatively insoluble wetting agents including some wetting agents which are generally considered to be insoluble in water although they are believed to be at least very slightly soluble. Among such materials are methyl phenyl ether, ethyl phenyl ether, amyl ethyl ether, iso-butyl ether, and other non-volatile ethers, n-hexyl acetate, n-heptyl acetate, iso-amyl acetate, amyl propionate, butyl propionate, iso-amyl propionate, n-butyl tartrate, sec-butyl glycolate and methylene di-ethyl ether.

It is, of course, possible to utilize any of the numerous coagulants for aqueous dispersions of rubber disclosed in the Patent No. 1,996,090 previously referred to but, as indicated in that patent, the water soluble salts of polyvalent metals generally are preferred. Salts such as calcium chloride, calcium nitrate, zinc chloride, zinc nitrate, zinc acetate and the like may be used. The "deposition base" employed in the present invention, of course, may be any base, form, or article of any nature whatsoever upon which rubber customarily is deposited, whether the rubber deposit is to be removed from the base as in the production of rubber gloves, toy balloons and the like, or whether the rubber deposit is to be permitted to remain permanently on the base as in rubber coated metal articles.

The aqueous dispersion of rubber employed in the present invention may be any naturally occurring or artificially prepared dispersion of natural or synthetic rubber or rubber-like material suspended in an aqueous medium and including dispersions of caoutchouc, gutta percha, balata and similar natural gums and resins and also synthetic rubber and rubber-like materials such as Neoprene, Thiokol, polyisobutylene and the like. All such dispersions may be stabilized, thickened, thinned, concentrated, diluted, vulcanized, unvulcanized, or otherwise prepared for use and may contain any desired stabilizing, compounding, vulcanizing, age-resisting, or other conditioning agents customarily employed in aqueous dispersions of rubber.

While the invention has been described in considerable detail with reference to certain preferred procedures and materials, numerous modifications and variations therein may be effected without departing from the spirit and scope of the invention as defined by the appended claims.

I claim:

1. A method of producing a rubber deposit on a base which comprises successively applying to the base a plurality of coatings including a coating of a non-coagulating composition comprising a wetting agent which is not more than 10% by weight soluble in water and a coating of a coagulating composition having an aqueous vehicle, and thereafter associating the coating with a coagulable aqueous dispersion of rubber.

2. A method of producing a rubber deposit on a base which comprises successively applying to the base a plurality of coatings including two coatings of a non-coagulating composition comprising a wetting agent which is not more than 10% by weight soluble in water and, between the two coatings of wetting agent, a coating of a coagulating composition having an aqueous vehicle, and thereafter associating the coated base with a coagulable aqueous dispersion of rubber.

3. A method of producing a rubber deposit on a base which comprises successively applying to the base a plurality of coatings including a coating of a non-coagulating composition comprising a wetting agent which is not more than 10% by weight soluble in water and a coating of a coagulating composition having an aqueous vehicle saturated with the said wetting agent, and thereafter associating the coated base with a coagulable aqueous dispersion of rubber.

4. A method of producing a rubber deposit on a base which comprises successively applying to the base a plurality of coatings including two coatings of a non-coagulating composition comprising a wetting agent which is not more than 10% by weight soluble in water and, between the two coatings of wetting agent, a coating of a coagulating composition having an aqueous vehicle saturated with the said wetting agent, and thereafter associating the coated base with a coagulable aqueous dispersion of rubber.

5. A method of producing a rubber deposit on a base which comprises preparing a fluid composition comprising an aqueous vehicle, a coagulant for aqueous dispersion of rubber and a non-coagulating wetting agent which is not more than 10% by weight soluble in water, the wetting agent being present in a quantity sufficient to provide a supernatant layer thereof on the surface of the composition, immersing a base in the prepared composition and thereafter associating the base with a coagulable aqueous dispersion of rubber.

6. A method of producing a rubber deposit on a base which comprises successively applying to the base a plurality of coatings including a coating of butyl lactate and a coating of a coagulating composition having an aqueous vehicle, and thereafter associating the coated base with a coagulable aqueous dispersion of rubber.

7. A method of producing a rubber deposit on a base which comprises preparing a fluid composition comprising an aqueous vehicle, a coagulant for aqueous dispersions of rubber and butyl lactate, the butyl lactate being present in a quantity sufficient to provide a supernatant layer thereof on the surface of the composition, immersing a base in the prepared composition, withdrawing the base from the composition, and thereafter associating the base with a coagulable aqueous dispersion of rubber.

8. A method of producing a rubber deposit on a base which comprises successively immersing a base in separate fluid compositions comprising, respectively, a non-coagulating composition containing a wetting agent which is not more than 10% by weight soluble in water and a coagulating composition having an aqueous vehicle, and thereafter associating the coated base with a coagulable aqueous dispersion of rubber.

9. A method of producing a rubber deposit on a base which comprises successively immersing a base in separate fluid compositions comprising, respectively, a non-coagulating composition containing butyl lactate and a coagulating composition having an aqueous vehicle, and thereafter associating the coated base with a coagulable aqueous dispersion of rubber.

10. A fluid composition for use in the production of rubber deposits directly from coagulable aqueous dispersions of rubber, said composition comprising an aqueous vehicle, a coagulant for aqueous dispersions of rubber, and a wetting agent which is not more than 10% by weight soluble in water, the wetting agent being present in a quantity sufficient to provide a supernatant layer thereof on the surface of the composition.

11. A fluid composition for use in the production of rubber deposits directly from coagulable aqueous dispersions of rubber, said composition comprising water as a vehicle, a salt of a polyvalent metal adapted to coagulate aqueous dispersions of rubber, and a wetting agent which is not more than 10% by weight soluble in water, the wetting agent being present in a quantity sufficient to provide a supernatant layer thereof on the surface of the composition.

12. A fluid composition for use in the production of rubber deposits directly from coagulable aqueous dispersions of rubber, said composition comprising water as a vehicle, a salt of a polyvalent metal adapted to coagulate aqueous dispersions of rubber, and butyl lactate as a wetting agent, the butyl lactate being present in a quantity sufficient to provide a supernatant layer thereof on the surface of the composition.

ROBERT E. THOMAS.